United States Patent [19]
Buehl

[11] Patent Number: 5,912,696
[45] Date of Patent: Jun. 15, 1999

[54] MULTIDIMENSIONAL RATING SYSTEM FOR MEDIA CONTENT

[75] Inventor: Joseph G. Buehl, Van Nuys, Calif.

[73] Assignee: Time Warner Cable, Stamford, Conn.

[21] Appl. No.: 08/779,962

[22] Filed: Dec. 23, 1996

[51] Int. Cl.$^6$ .................................................. H04N 7/16
[52] U.S. Cl. .............................................. 348/5.5; 380/20
[58] Field of Search ................................. 348/5.5; 380/20

[56] References Cited

U.S. PATENT DOCUMENTS 5,195,135   3/1993   Palmer ........................................ 380/20

OTHER PUBLICATIONS

*System Information for Digital Television*, ATSC Standard, Advanced Television Systems Committee, Jan. 3, 1996.

*Primary Examiner*—Salvatore Cangialosi
*Attorney, Agent, or Firm*—John R. Wahl; Robert G. Crouch; Holland & Hart LLP

[57] ABSTRACT

An adaptive multidimensional media asset rating system and method for selective play of a media asset includes an N-dimensional rating vector encoded into the leader portion or meta-data portion of a media asset. This N dimensional rating vector has a magnitude value for each of the N dimensions and is assigned to each asset by the asset producer. A user programmable asset filter system, responsive to the encoded vector, is incorporated into or added on to the media asset playing device. The rating vector is then read from the asset by the filter system in or connected to the media asset playing device such as a TV, videotape recorder/player, radio receiver CD player, or other reception device prior to processing the asset for viewing. The user programs into the filter system coupled to the asset player or reception device a threshold N dimensional preference vector which has a magnitude value for each of the N dimensions. The reception or playing device uses the filter system to block or play the incoming asset based on comparison of the preference vector to the rating vector.

20 Claims, 3 Drawing Sheets

MULTIDIMENSIONAL RATING SYSTEM FOR MEDIA CONTENT

BACKGROUND OF THE INVENTION

Field of the Invention

This invention generally relates to communication and entertainment media asset delivery systems and more particularly to a system for rating media content according to weighting parameters in predetermined categories.

Media assets are commodities such as video tapes, audio tapes, TV and radio programs, etc. The present rating system most widely used in the United States is a single dimensional system for categorizing perceived offensive nature of the media asset content. Further, this system applies only to movies. This system, adopted by the Motion Picture Arts Association (MPAA) uses a single scale of "G" for content deemed acceptable for all audiences, "PG" for content deemed acceptable for most audiences subject to parental discretion, "PG-13" for content deemed acceptable for audiences over 13 years of age subject to parental discretion, "R", "NC-17", and "X", etcetera. These categories are attempts by the movie industry to alert viewers and parents to the general nature of the media content, such as amount and extent of violence, nudity, sex, and offensive language.

However, this system leaves a lot to be desired. First, different viewers will find different things offensive. Second, the "one size fits all" type of single dimensional rating system does not account for cultural differences, religious differences, and backgrounds of the viewing audiences. Such a system also does not give any distinguishing information about the levels within different categories of perceived offensive material that may be present in the media asset. Such a system also does not apply to audio tapes and compact disks.

Another problem with the current systems is that audio and video recorders and players are literally everywhere. Parents have little actual direct control over their children's access to the media content of videotapes and TV programs available in the home except to lock them up or simply turn off the TV or radio.

The Advanced Television Systems Committee has considered the various existing rating systems. Their accommodation for rating systems is reflected in a recently issued document entitled "System Information For Digital Television ATSC Standard" issued in January 1996.

SUMMARY OF THE INVENTION

The multidimensional rating system in accordance with the present invention is designed to directly address the concerns identified above and overcome the deficiencies in the current rating systems. The difficulty which is overcome in the present invention, is that the broad differences in cultures within our society and the different degrees of tolerance and acceptance of behaviors by various people and groups of people within our now global society, result in different weights being given to each of the above mentioned dimensions. The system in accordance with the present invention permits the end user of an asset or his/her parent(s) to conveniently assert a level of individual control over what assets are played in his/her presence or his/her children's presence.

The rating system in accordance with the present invention is an adaptive multidimensional system which includes an N-dimensional rating vector encoded into the leader portion or meta-data portion of an analog or digitally encoded media asset prior to public dissemination or transmission and a corresponding programmable decoding device provided at the receiving end of the transmission on or in the receiving device. The system is particularly suited for digitally recorded and transmitted media assets such as interactive digital television (IDTV), but is equally applicable to other types of media assets and their reception or playing devices which are currently available.

The N dimensional rating vector has a keyword and a magnitude value pair for each of the N dimensions. The vector is assigned to each asset by the asset producer or by an independent review and evaluation entity in accordance with established dimension definition criteria and magnitude definition criteria. A user programmable asset filtering device, responsive to the encoded vector, is incorporated into or added externally to the media asset receiver or playing apparatus via internal circuitry or, for example, through an external "set top" box typically used for cable television receivers. The rating vector is then read from the asset by the filter in or connected to the media asset playing apparatus such as a TV, videotape recorder/player, radio receiver, CD player, computer, or other reception apparatus prior to further processing the encoded asset for viewer reception and/or display. The user programs into the filtering device a threshold N dimensional preference vector which has a magnitude value for each of the N dimensions. The filtering device then automatically compares and blocks or passes the incoming asset according to the stored preference vector.

More specifically, these preference dimensional values are automatically compared with the rating vector dimensional values coded into the leader or meta-data portion of the asset. If any one dimensional value of the asset rating vector is greater than the corresponding preference dimensional value, the filtering device blocks the signal and prevents the digital transmission asset, videotape, CD, etc. from being processed further, thus preventing user access to the actual content of the asset, i.e. preventing the user from seeing or hearing the asset.

The method in accordance with one embodiment of the present invention of preventing unauthorized play of a media asset on an asset player device comprises the steps of: encoding a multidimensional rating vector on the asset; detecting the rating vector prior to the player device playing asset; receiving and storing a user preference vector, the preference vector having the plurality of dimensions and a user supplied preference value for each dimension; comparing the dimensional values of the rating vector to corresponding dimensional values of the preference vector; and finally, blocking play of any asset having at least one rating value greater than a corresponding preference value.

This rating vector has a plurality of dimensions, each dimension representing a defined characteristic. These characteristics may include sexual content, violence, and offensive language. Each of the dimensions is provided with an assigned rating value. This rating vector is then transferred or transmitted along with the asset to the end user's player device.

The method according to the present invention may also include the further step of comparing a preference dimension flag to a corresponding rating dimension. For example, the vector may include a dimension such as "cartoon" to signify the type of subject matter in the asset, without assigning a magnitude value. The user may correspondingly set a "cartoon" flag. If this flag is set, the filter will either block or pass any asset having a corresponding rating dimension "cartoon".

The method according to the present invention may also include the further step of requiring a user access security code programmed into the player device to permit only authorized changes to be made to the preference vector stored in the player device. This security access code may be a subroutine incorporated into the input stage of the player's user interface or may be a manufacturer determined code or series of steps, etc. which the parent or other responsible user may use to ensure that only certain assets may be played.

In order for this system to automatically function, the receiving device must be incorporated into or connected to the user's playing device. The receiving device may be a separate box containing a microprocessor, memory and a user interface such as a keypad for entry of the threshold values attached to the player or TV. Alternatively, the receiving device may be incorporated into the front end circuitry of the TV or VCR and the unit's existing local or remote controls as a user programmable feature. In either case, the end user has the capability to control the content of material played by the TV or VCR etc.

In this way, individuals may customize the types of material to which their children have access, rather than relying on a global classification by others. In addition, the system in accordance with the present invention is adaptive and can be expanded as new rating dimensions are developed and implemented by the media industry. These and other objects, features and advantages of the present invention will become more apparent from a reading of the following detailed description of the invention when taken in conjunction with the accompanying drawing figures.

DETAILED DESCRIPTION OF THE INVENTION

Figure 1:
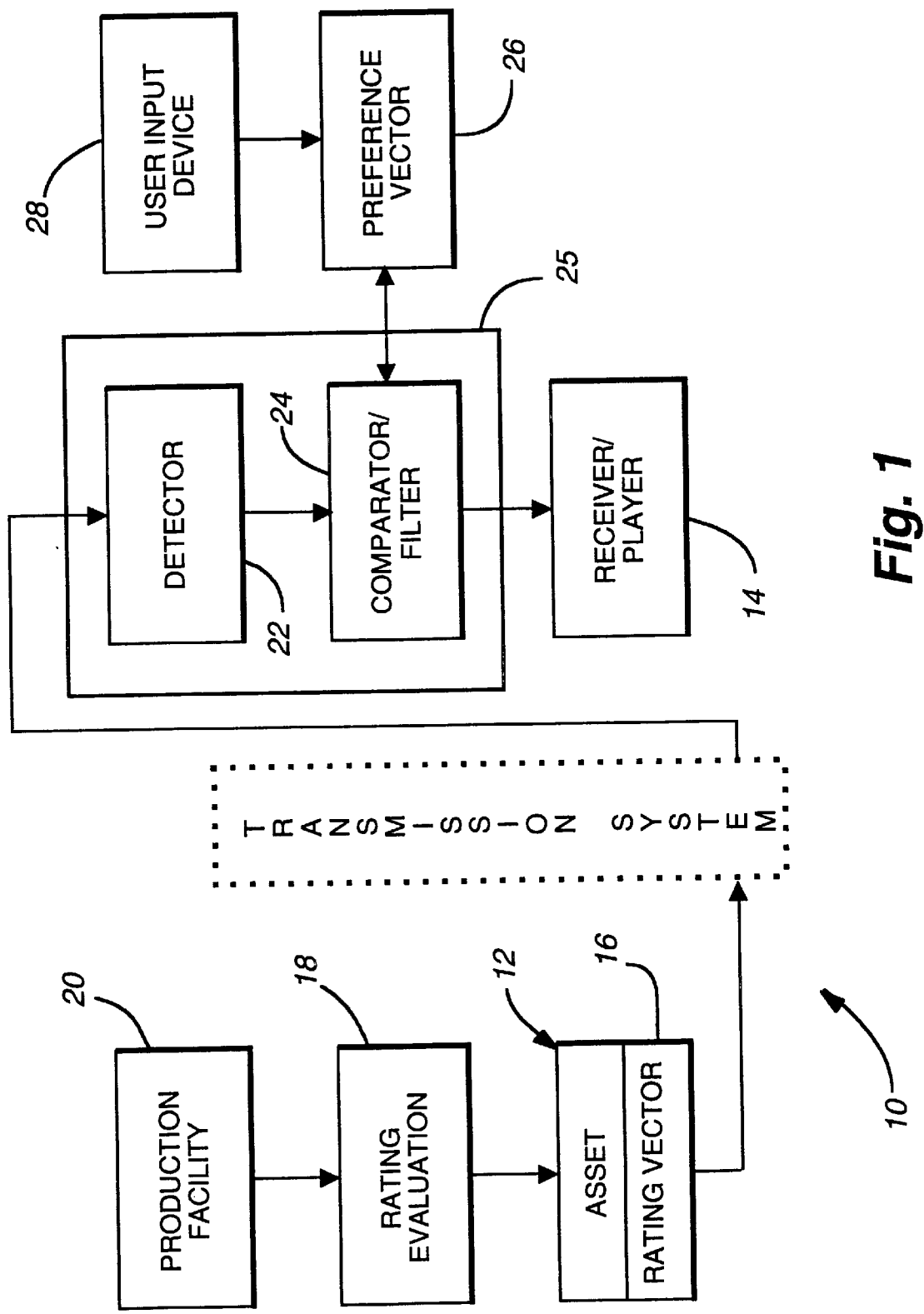
FIG. 1 is a block diagram of the system in accordance with the invention.

Referring now to FIG. 1, a multidimensional media content rating system 10 in accordance with the present invention comprises an analog or digitally encoded media asset 12 and an asset receiving or player device 14 such as a radio, a VCR, or a television set. Preferably, the asset is a digitally encoded or recorded asset. The asset 12 includes movies, broadcast programs, preview "trailers", video posters, entries in a viewer programming guide, commercials, etc. An asset, as used in this application, is intended to be broadly encompassing of any media product that can be transmitted or transported and then played by an end viewer/user.

The asset 12 preferably includes, at the beginning of the encoded asset data, i.e. at the beginning of the CD, tape, videotape, etc., meta-data which provides the name, license number, tracking number, serial number, length, and other technical information about the asset 12. Incorporated preferably into the meta-data of the asset 12 is an asset rating vector 16. This asset rating vector 16 is preferably encoded as a binary string on the lead portion of the meta-data of the asset. This asset rating vector 16 is a multidimensional vector which preferably has at least three dimensions, and is expandable to any number of dimensions "n".

Each of the dimensions represents a defined characteristic. Examples of these characteristics as presently envisioned are sex, violence, and offensive language. There may be more dimensions to be added in the future as our society may change and demand. The present invention is readily adaptable to such changes as an asset rating vector is not limited by the number of dimensions which may later be defined and included. For example, the system may be expanded to include dimensions for a large range of subjects.

Each of the dimensions in the asset vector 16 is a keyword/value pair. The asset vector 16 is thus a series of keyword/value pairs as is shown in Table 1. The dimensional keyword is an alpha string such as "sex", "violence" or "language". The dimensional value is preferably an integer number within a predefined range. As presently envisioned, these values are planned to be integers within a range, for example, between zero and ten, with a zero meaning that the dimension has little or no content to which the dimension is concerned. For example, a present day rating of "G" by the MPAA might receive a multidimensional rating of sex=0, violence=0 and language=0. In contrast, an R rated asset might have a multidimensional rating of sex=6, violence=8, and language=6 and an "x" rated asset might have a rating of sex=9, violence=2 and language dimensional value=8. The values given in Table 1 provide another example of an asset rating vector having three dimensions, expandable to n dimensions.

TABLE 1

| | Asset Rating Vector Values | |
|---|---|---|
| | KEYWORD | VALUE |
| 1 | SEX | 4 |
| 2 | VIOLENCE | 6 |
| 3 | LANGUAGE | 5 |
| n | n | — |

As society grows and changes, the system in accordance with the present invention can grow and change along the way, with new dimensions "n" being added by the media industry along with predefined value numbers within predefined ranges. Acceptable values can then be chosen and/or changed by the individual.

The producers of each asset perform a review and evaluation 18 of the asset preferably at the production facility 20 where the final release version of the asset 12 is edited and packaged for distribution to the end users. The producers encode the keywords and assign the dimensional values (magnitudes) to the asset in accordance with previously set forth definitions of each of the dimensional keywords and value numbers. These values provide a baseline rating of the asset content for use by the end user in determining user preferences as will be subsequently described.

The system of the invention 10 also includes a means 22 for detecting the assigned rating vector 16 at the receiver or player device 14 prior to the player device playing the asset 12. This detecting means 22 may be nothing more than a digital code trigger sequence, e.g., a software program or subroutine, which signals to the receiver that the following data is the rating vector, and directs the data to a comparator/filter 24. Alternatively, the rating vector 16 may simply be a 64 bit data stream at the beginning of the digitized asset 12, with sex, violence, and language values, etc. being sequentially ordered data groups within this data string.

The system 10 also includes, operatively coupled into the player or receiver device 14, a means, such as a set top box 25 containing programmable memory for receiving and storing a preference vector 26 inputted by the end user. The set top box may also contain the detector means 22 and the comparator/filter 24. This preference vector 26 has the same dimensions, if not more dimensions than the rating vector 16. The user inputs the values for each of the dimensions which then serve as threshold values for the comparator/filter 24. The input means 28 may be a keypad or conventional remote control device and the preference vector 26 is preferably stored in nonvolatile memory within the set top box 25 or the receiving/playing device 14. Typically each of the dimensional values would be stored in its own register for later use. A typical preference vector is shown below in Table 2.

TABLE 2

User Preference Vector Values

|   | KEYWORD | VALUE | FLAG? |
|---|---------|-------|-------|
| 1 | SEX | 2 | |
| 2 | VIOLENCE | 9 | |
| 3 | LANGUAGE | 8 | |
| 4 | Cartoon | — | Yes |
| n-1 | — | — | |
| n | — | — | |

The comparator/filter 24 is preferably a software subroutine within the control program in the set top box 25 for the player which takes the individual asset rating dimensional values and compares them to the corresponding viewer preference values. One example of such a subroutine follows. A flag is set for each asset rating value that exceeds a viewer preference value. If there are any flags set, the playing device will not play the asset operatively connected to the player or being received by the player. The comparator/filter routine 24 compares the dimensional values of an asset rating vector to corresponding dimensional values of a viewer preference vector and blocks play of assets having at least one asset dimensional rating value greater than a corresponding viewer preference dimensional value.

The following subroutine, in C++, demonstrates one example of such a subroutine for filtering:

```
typedef struct rating_dimension
{
    char * identifier;
    unsigned int value;
};
typdef struct rating_vector
{
    unsigned int n_dimensions;
    rating_dimension * rating;
};
boolean IsBlocked(rating_vector& asset_rating,
                  rating_vector& viewer_rating)
{
    for (int i=0; i <asset_rating.n_dimensions;i++)
    {
        for (int j=0; j <viewer_rating.n_dimensions;j++)
        {
            if(!strcmp(asset_rating.rating[i].identifier,
                viewer_rating.rating[j].identifier))
            {
                if(asset_rating.rating[i].value>
                    view_rating.rating[j].value)
                {
                    return TRUE;
                }
            }
        }
    }
    return FALSE;
}
```

Figure 2A:
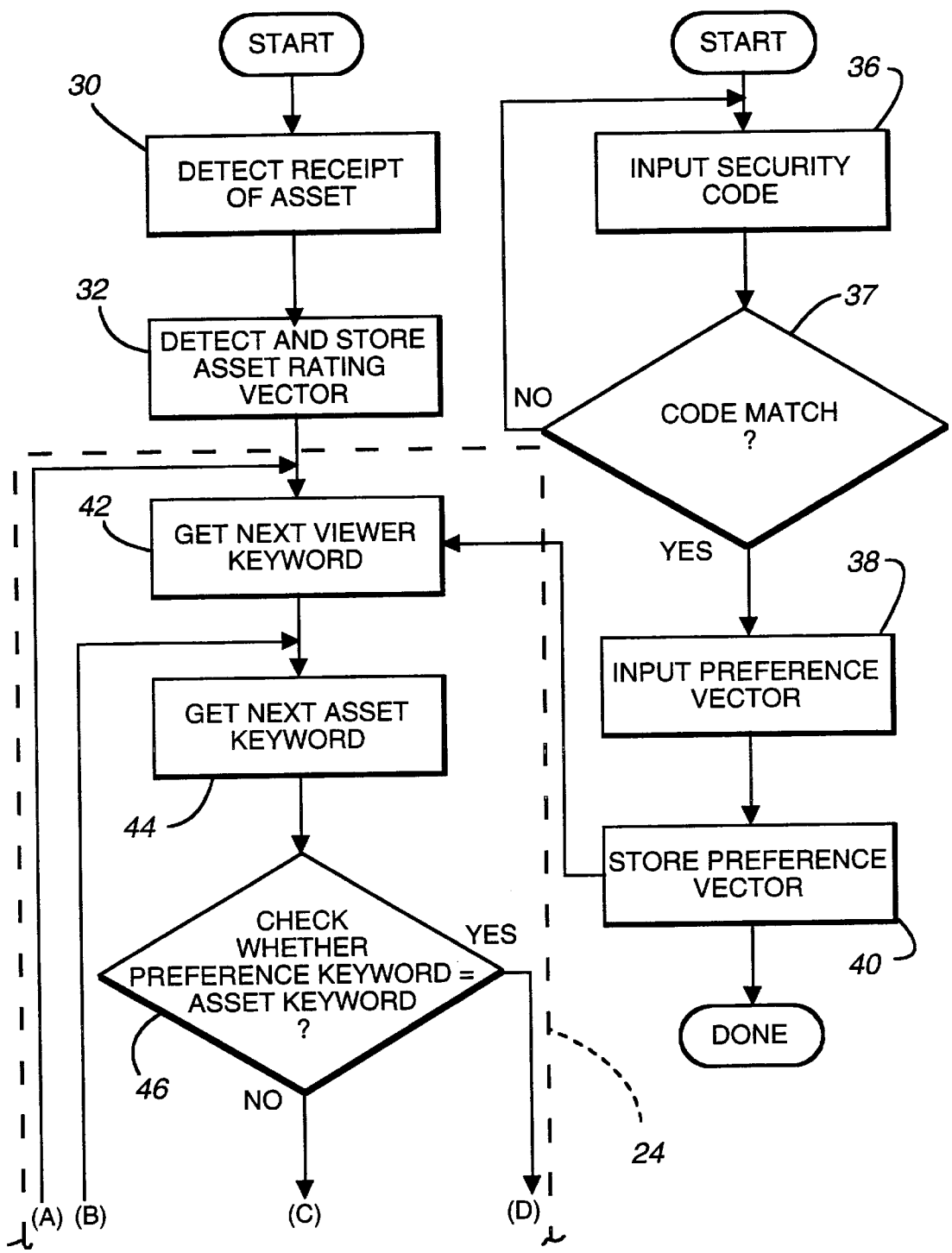
FIG. 2A and 2B is a flow diagram of the operation of a preferred embodiment of the multidimensional rating system in accordance with the invention.
Figure 2B:
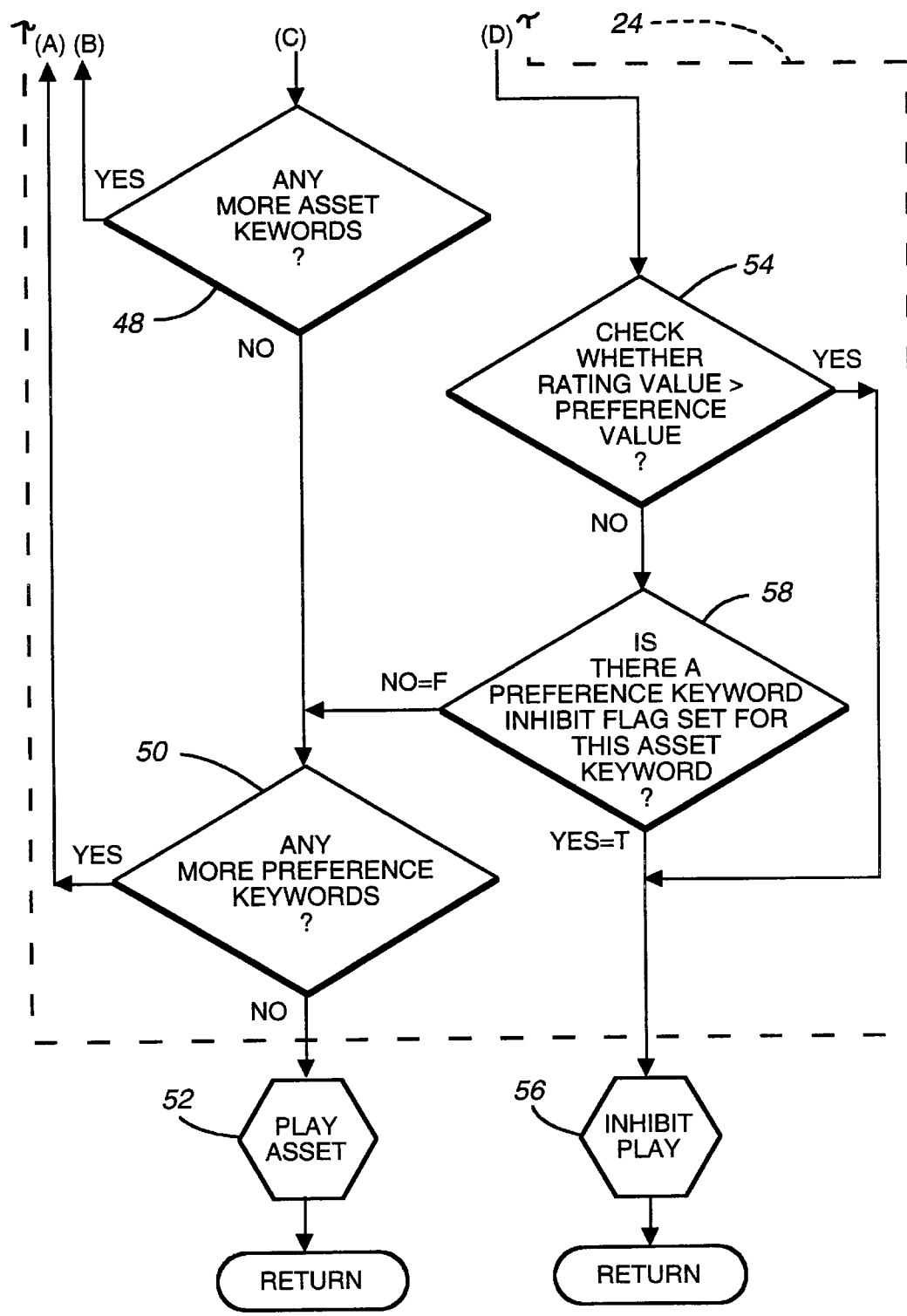

Referring now to FIG. 2A and 2B, an operational flow diagram of a preferred program in the set top box 25 on the player device 14 of the system 10 of the invention is shown. A user, in operation 30, inserts an asset 12 to be played into the playing device 14 (or turns on the receiver to receive a digitally transmitted asset). The detector 22, in operation 32, senses the rating vector 16 and passes the rating vector code to the comparator/filter 24.

The system in accordance with the present invention may be supplemented by an optional security authorization routine in order to input user preference vectors into the set top box 25. In this case, prior to the user inserting an asset 12 into the player device 14, a control person, such as a parent, may input a user security code into the device 14 in operation 36. The security code is verified in operation 37 and, if the right code has been entered, the control person or user then provides a preference vector 26 into memory in operation 38. The set top box 25 in operation 40 stores this preference vector 26 in memory.

When an asset 12 is inserted into or received by the player 14 and an asset rating vector 16 is sent to the comparator/filter 24, the comparator/filter 24 queries the player for the presence of a viewer preference vector 26. If a viewer preference vector 26 is sensed, the program flow proceeds as follows.

In operation 42, a first or next viewer preference keyword is retrieved from memory. Flow then proceeds to operation 44, where a first or next asset rating keyword is retrieved from memory. The preference keyword is compared to the asset rating keyword in operation 46 and, if there is no match, flow proceeds to operation 48. Operation 48 queries whether there are any more asset keywords in the asset rating vector 12. If there are no more asset keywords flow transfers to operation 50 where the memory is queried for any more viewer preference keywords. If there are no more viewer preference keywords, then control is transferred to the player 14 in operation 52 and the asset 12 is played.

However, back in operation 46, if the answer is yes, there is a match between the viewer preference keyword and the asset rating keyword, then flow transfers to operation 54 where the program queries whether the asset rating value associated with this asset rating keyword is greater than the viewer preference value. If the answer is yes, then control transfers to operation 56 where play of the asset is blocked. Control then returns to operation 30 for receipt of another asset.

If the answer in operation 54 is no, then flow transfers to operation 58 where the program queries whether, for this asset rating keyword, a viewer preference flag has been set. If the answer is yes, then control again transfers to operation 56 and play of the asset is blocked. If the answer is no, then control transfers to operation 50 where the memory is queried for any more viewer preference keywords as described above.

If the answer in operation 48 is yes, then control is transferred back to operation 44 where the next asset keyword is entered. Flow then proceeds through operations 46 and 48 again as above described using this next asset keyword and its corresponding asset rating value.

As shown in Table 2, a user may input his/her own keyword or keywords. These user provided preference keywords, if there is a corresponding asset rating keyword, will be processed according to their corresponding values. However, the user may prefer that if the rating keyword exists, then asset play should be blocked. For example, say a user does not want any cartoons shown on the TV or VCR. If the media industry provides a keyword "cartoon" as a subject matter keyword, and the flag is set as in Table 2, then no cartoons will be shown or played. This would occur since the answer in operation 58 would be yes, thus transferring control to the block play operation 56. Control could also be passed to a display message to indicate to the user that the asset play is denied.

The present invention also provides the potential capability for a user to program user defined keywords into the system. For example, assuming a user does not want cartoons to be accessed, the user would program in the keyword "cartoon" and set the corresponding flag. If the comparator/filter finds a matching keyword in the asset rating vector, that particular asset would be blocked. The comparator/filter 24 may also be applied to cable transmitted program scheduling information assets in order to customize the scheduling of programs. Utilizing the preference vector in Table 2, and assuming that the asset rating vector also includes subject dimension keywords such as "cartoon", the end result could be that the viewer receives a program listing display devoid of any cartoon listings.

This example of the present invention would require the industry to further classify the asset content by subject and not merely rate its content as is currently done. For this expanded system to work, the industry would have to publish the keyword classifications so that the user could properly utilize the system.

The present invention has been described with reference to various embodiments thereof for descriptive purposes and not by way of limitation. Various modifications, changes, and alternatives to the particular embodiments described will be apparent to those skilled in the art to which the invention pertains. For example, the subroutine described above in C++ is only exemplary. Other languages and routines may be used to perform the operations described above and shown in the figures. All such alternatives and variations are intended to be within the scope of the invention as defined by the following claims. All patents, patent applications, and printed publications referred to herein are hereby incorporated by reference in their entirety.

What is claimed is:

1. A multidimensional media content rating system comprising:
   a media asset;
   an asset player device;
   a rating vector encoded on said asset, said rating vector having a plurality of rating dimensions, each of said dimensions representing a defined characteristic, each of said dimensions having a rating value;
   a rating vector detector detecting said rating vector on said asset prior to said player device playing said asset;
   said player device receiving and storing a user preference vector, said preference vector having a plurality of dimensions corresponding to the plurality of dimensions in said rating vector and a user supplied preference value for each dimension; and
   a filter operatively connected to said player comparing said dimensional values of said rating vector to corresponding dimensional values of said preference vector and blocking play of any portion of a media asset having at least one rating value greater than a corresponding preference value.

2. The system according to claim 1 wherein said filter comprises a computer program for a computing system coupled to said player.

3. The system according to claim 2 wherein said asset is digitally coded and said rating vector is digitally encoded in meta-data for said asset.

4. The system according to claim 1 wherein said rating and preference vectors have at least three dimensions: sex, violence, and language.

5. The system according to claim 4 wherein each of said rating and preference values is an integer in a predetermined range of integers.

6. A method of preventing unauthorized play of a media asset on an asset player device where a rating vector is encoded on said asset, the rating vector having a plurality of dimensions, each of said dimensions representing a defined characteristic, at least one of said dimensions having a rating value, said method comprising the steps of:
   receiving and storing a user preference vector, said preference vector having at least one of said plurality of dimensions and a user supplied preference value for at least one of said dimensions;
   detecting said rating vector prior to said player device playing said asset;
   comparing said dimensional values of said rating vector to corresponding dimensional values of said preference vector; and
   blocking play of any portion of said asset if said comparing step detects at least one rating value greater than a corresponding preference value; and playing the asset if said comparing step detects no rating value greater than a corresponding preference value.

7. The method according to claim 6 wherein said step of receiving further comprises the step of requiring a user access security code to permit only authorized changes to be made to said stored preference vector.

8. The method according to claim 6 wherein each of said rating vector dimensions has a corresponding dimensional value associated therewith.

9. The method according to claim 8 wherein said rating and preference vectors have at least three dimensions including sex, violence, and language.

10. The method according to claim 8 wherein each of said rating and preference values is an integer between 0 and 10.

11. A method of preventing unauthorized play of a media asset on an asset player device where a rating vector is encoded on said asset, the rating vector having a plurality of dimensions, each of said dimensions representing a defined characteristic, each one of said dimensions having a rating value in a predefined range of values, said method comprising the steps of:
   receiving and storing a user preference vector, said preference vector having at least said plurality of dimensions and a user supplied preference value for each one of said plurality of dimensions;
   detecting said rating vector prior to said player device playing said asset;
   comparing said dimensional values of said rating vector to corresponding dimensional values of said preference vector; and
   blocking play of any portion of said asset if said comparing step detects at least one rating value greater than a corresponding preference value; and playing the asset if said comparing step detects no rating value greater than a corresponding preference value.

12. The method according to claim 11 wherein said step of receiving further comprises the step of requiring a user access security code to permit only authorized changes to be made to said stored preference vector.

13. The method according to claim 11 wherein each of said rating vector dimension values is an integer.

14. The method according to claim 11 wherein said rating and preference vectors have at least three dimensions including sex, violence, and language.

15. The method according to claim 13 wherein each of said rating and preference values is an integer between 0 and 10.

16. A multidimensional media content rating system comprising:

a media asset;

an asset player device;

a rating vector encoded on said asset, said rating vector having a plurality of rating dimensions, each of said dimensions representing a defined content characteristic, each of said dimensions having a rating value;

a rating vector detector detecting said rating vector on said asset prior to said player device playing said asset;

said player device receiving and storing a user preference vector, said preference vector having a plurality of dimensions corresponding to at least two of the plurality of dimensions in said rating vector and a user supplied preference value for each of said preference dimensions; and a filter operatively connected to said player comparing said dimensional values of said rating vector to corresponding dimensional values of said preference vector and blocking play of any portion of a media asset having at least one rating value greater than a corresponding preference value.

17. The system according to claim 16 wherein said filter comprises a computer program for a computing system coupled to said player.

18. The system according to claim 17 wherein said asset is digitally coded and said rating vector is digitally encoded in meta-data for said asset.

19. The system according to claim 18 wherein said rating and preference vectors have at least three dimensions: sex, violence, and language.

20. The system according to claim 19 wherein each of said rating and preference values is an integer within a predetermined range of integers.

* * * * *